United States Patent
Lee et al.

(10) Patent No.: US 8,463,340 B2
(45) Date of Patent: Jun. 11, 2013

(54) COMMUNICATION TERMINAL HAVING MULTIPLE ANTENNAS AND METHOD FOR PERFORMING ACCESS TO COMMUNICATION SYSTEM THEREOF

(75) Inventors: Jong In Lee, Gyeonggi-do (KR); Kun Hui Yi, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 197 days.

(21) Appl. No.: 12/748,557

(22) Filed: Mar. 29, 2010

(65) Prior Publication Data

US 2010/0291922 A1  Nov. 18, 2010

(30) Foreign Application Priority Data

May 18, 2009  (KR) .................. 10-2009-0042916

(51) Int. Cl.
  *H04M 1/00*  (2006.01)
(52) U.S. Cl.
  USPC .......... 455/575.7; 455/432.1; 455/552.1; 455/193.2; 343/876
(58) Field of Classification Search
  USPC .......... 455/432.1, 575.7, 550.1, 552.1, 553.1, 455/193.2, 193.1, 432.2; 343/876, 893; 370/310–350
  See application file for complete search history.

(56) References Cited

U.S. PATENT DOCUMENTS

| | | | |
|---|---|---|---|
| 6,456,257 B1* | 9/2002 | Zamat ........................... | 343/876 |
| 6,529,749 B1* | 3/2003 | Hayes et al. ............... | 455/575.7 |
| 6,954,180 B1* | 10/2005 | Braun et al. ................. | 343/702 |
| 7,069,043 B2* | 6/2006 | Sawamura et al. ......... | 455/550.1 |
| 7,245,913 B1* | 7/2007 | Nguyen et al. ............. | 455/435.2 |
| 7,415,295 B2* | 8/2008 | Tran ........................... | 455/575.7 |
| 7,710,935 B2* | 5/2010 | Mahany ....................... | 370/338 |
| 7,899,490 B2* | 3/2011 | Park et al. .................. | 455/552.1 |
| 2003/0114188 A1* | 6/2003 | Rousu ........................... | 455/553 |
| 2004/0204039 A1* | 10/2004 | Ogawa ........................ | 455/553.1 |
| 2006/0073829 A1* | 4/2006 | Cho et al. ....................... | 455/439 |
| 2006/0084395 A1* | 4/2006 | Kezys et al. ................. | 455/101 |
| 2007/0225053 A1* | 9/2007 | Iwai et al. .................. | 455/575.7 |
| 2007/0232350 A1* | 10/2007 | Dunn et al. ................. | 455/552.1 |
| 2008/0119183 A1* | 5/2008 | Kono ........................... | 455/432.1 |
| 2009/0149174 A1* | 6/2009 | Xue et al. ................... | 455/432.1 |
| 2009/0170461 A1* | 7/2009 | Kwon et al. ............... | 455/277.1 |
| 2010/0255892 A1* | 10/2010 | Harada ....................... | 455/575.1 |

* cited by examiner

*Primary Examiner* — Allahyar Kasraian
(74) *Attorney, Agent, or Firm* — Cha & Reiter, LLC

(57) ABSTRACT

Provided is a method of accessing to a communication system in a terminal comprising a plurality of antennas, which includes determining a home system which is previously set to preferentially access from a preferred roaming list of a plurality of communications systems, when power is turned on; connecting a system switch to a home antenna for communicating with the home system in a specific frequency band; and accessing the home system to use the home service through the home antenna.

17 Claims, 5 Drawing Sheets

COMMUNICATION TERMINAL HAVING MULTIPLE ANTENNAS AND METHOD FOR PERFORMING ACCESS TO COMMUNICATION SYSTEM THEREOF

CLAIM OF PRIORITY

This application claims the benefit of the earlier filling date, under 35 U.S.C. §119, from patent application serial no. 10-2009-0042916 filed in the Korean Intellectual Property Office on May 18, 2009, the contents of which are incorporated by reference in its entirety, herein.

BACKGROUND OF THE INVENTION

1. Field of the Invention

The present invention relates to a communication terminal, and more particularly, to a communication terminal including a plurality of antennas and a method of accessing a communications system.

2. Description of the Related Art

A communication system typically provides various multimedia services such as video, music, game or the like. In some systems, a high-speed data transmission rate has to be guaranteed to meet high capacity multimedia service. The communication terminal selectively accesses one of a plurality of communication systems to use a plurality of frequency bands. To this end, the communication terminal includes a plurality of antennas for sending and receiving signal for each communications system. However, multiple antennas have to be operated as one body to send and receive signal at one of the frequency bands. However, there is an interference problem caused by electromagnetic couplings between antennas. Such problem becomes more exacerbated with evermore miniaturization trend of communication terminal. That is, as a gap between antennas becomes narrower, interference between antennas is worsening.

Accordingly, a technology for preventing interference between antennas is required.

SUMMARY OF THE INVENTION

The present invention is made in view of the above problems, and provides a method of accessing communication systems by a terminal including a plurality of antennas.

In accordance with an aspect of the present invention, a method of accessing a communication system of the type having a terminal with a plurality of antennas includes: determining a home system which is previously set to preferentially access from a preferred roaming list of a plurality of communications systems when power is turned on; connecting a system switch to a home antenna for communicating with the home system at a specific frequency band; and accessing the home system to use the home service through the home antenna.

According to an aspect of the present invention, a method of accessing a communication system in a terminal comprising a plurality of antennas further includes determining a roaming system which is previously set to access a second priority instead of the home system from the preferred roaming list.

According to an aspect of the present invention, a method of accessing a communication system in a terminal comprising a plurality of antennas further includes connecting the system switch to a roaming antenna for communicating in a frequency band different from the roaming system if the home system is not accessed; and accessing the roaming system to use the roaming service through the roaming antenna.

According to an aspect of the present invention, a method of accessing to a communication system in a terminal comprising a plurality of antennas further includes connecting the system switch to the roaming antenna in case of roaming when using the home service; and accessing the roaming system to use the roaming service through the roaming antenna.

According to an aspect of the present invention, a method of accessing to a communication system in a terminal comprising a plurality of antennas further includes connecting the system switch to the home antenna in case of roaming when using the roaming service; and accessing to the home system to use the home service through the home antenna.

In accordance with another aspect of the present invention, a communication terminal using multi frequency band includes a memory which stores a preferred roaming list configured of a plurality of communications systems; a home antenna configured to access a home system which is previously set to preferentially access from the preferred roaming list and provides a home service through a certain frequency band; a roaming antenna configured to access a roaming system providing a roaming service through a frequency band which is different from that of the home system; a system switch connected to one of the home antenna or the roaming antenna; and a controller which controls the system switch to be connected to the home antenna when power is turned on and accesses the home system to use the home service through the home antenna.

Preferably, the controller controls the system switch to connect to the roaming antenna in case the home system is not accessed, and access the roaming system to use the roaming service through the roaming antenna. Preferably, the controller controls the system switch to connect to the roaming antenna in case of roaming when using the home service, and access the roaming system to use the roaming service. Preferably, the controller controls the system switch to connect to the home antenna, in case of roaming when using the roaming service, and access the home system to use the home service.

In a communications terminal including a plurality of antennas and a method of accessing to communications system according to the present invention, a plurality of antennas can be mutually isolated and operated through a system switch. That is, in case one of a plurality of antennas operates in the communications terminal, the operation of rest antennas is restricted. Thus, interference between antennas can be prevented.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF THE INVENTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Hereinafter, a term "home system" is one of a plurality of communication systems to be accessed by a terminal and refers to the preferential communication system. Here, home system can be changed according to current location of the communication terminal. A term "home service" refers to communication service provided by the home system. A term "home antenna" refers to an antenna for using home service of the home system.

A term "roaming system" is one of the communications systems, and refers to the second best communication system in lieu of the home system. Here, the roaming system can be changed according to the current location of communications terminal. A term "roaming service" refers to a communication service provided by the roaming system. A term "roaming antenna" refers to an antenna for using roaming service of the roaming system.

A specific communication system can be a home system with respect to other communication system, and can be a roaming system with respect to other communication system. That is, communication systems can be determined as home system or roaming system according to priority set in the communication terminal. A term "roaming" means that communication terminal moves among a plurality of communication systems so that accessing is changed. A communication terminal can perform roaming from home system to roaming system, and/or can perform roaming from roaming system to home system.

Hereinafter, a communication terminal including a plurality of antennas according to an exemplary embodiment of the present invention is illustrated.

Figure 1:
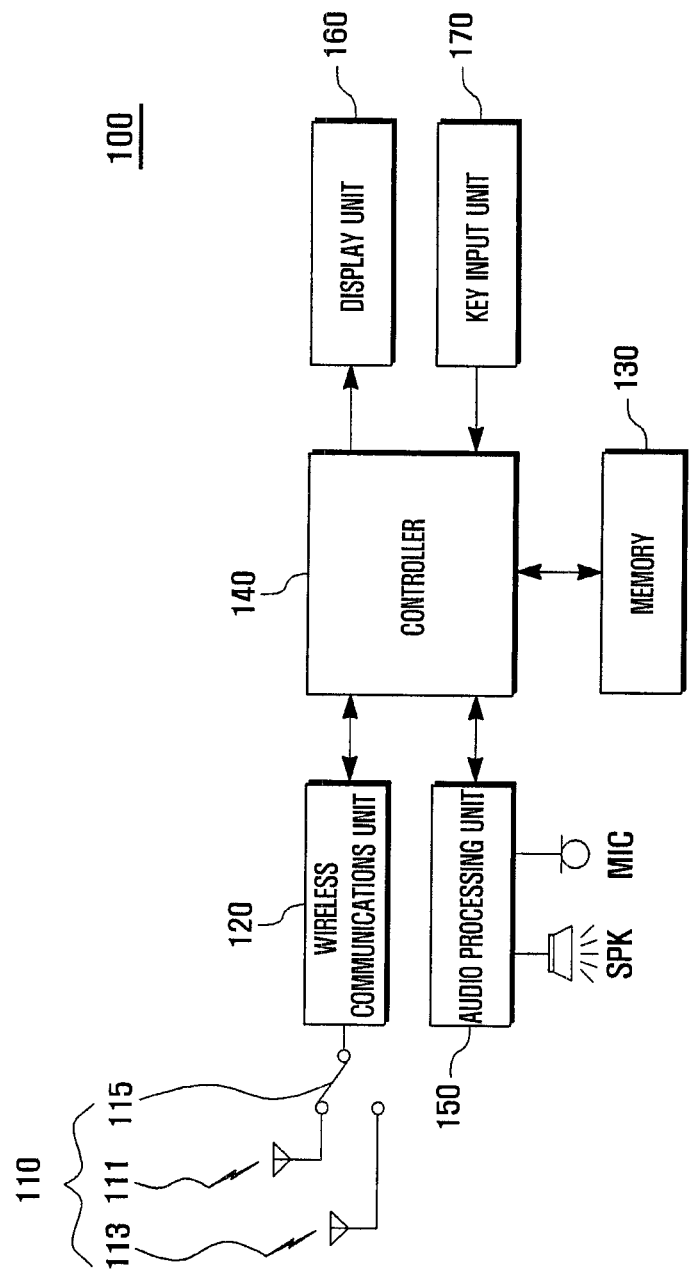
FIG. 1 is a block diagram of a communication terminal according to an exemplary embodiment of the present invention.
Figure 2:
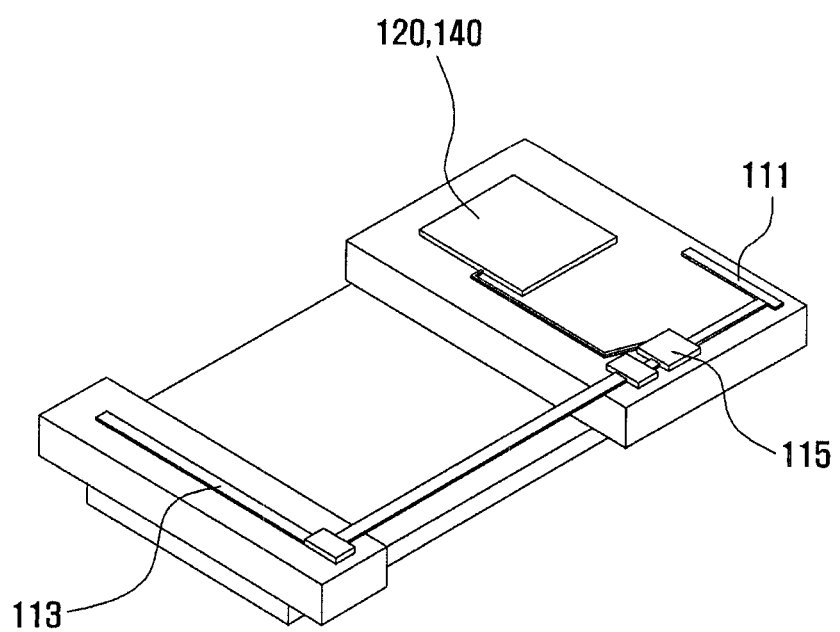
FIG. 2 is a perspective view of a communication terminal according to an exemplary embodiment of the present invention.

FIG. 1 is a block diagram of a communication terminal according to an exemplary embodiment of the present invention. FIG. 2 is a perspective view of a communications terminal according to an exemplary embodiment of the present invention.

For illustrative purposes, the communication terminal is a mobile phone, but should be noted that other mobile computer devices, such as a personal digital assistant (PDA), a personal communication assistant (PCA), an electronic organizer, or any duplex interactive devices may be applicable.

Referring to FIG. 1, a communication terminal 100 of the embodiment includes an antenna device 110, a wireless communication unit 120, a memory 130, a controller 140, an audio processing unit 150, a display unit 160, and a key input unit 170. According to the embodiment of the present invention, the antenna device 110 includes a home antenna 111, a roaming antenna 113 and a system switch 115. The home antenna 111 and the roaming antenna 113 alternatively operate. Here, the home antenna 111 and the roaming antenna 113 can be formed of metal pattern. The system switch 115 is switchably connected to one of the home antenna 111 and the roaming antenna 113. The system switch 115 can be a SPDT (Single Pole Double Through) switch.

Moreover, as shown in FIG. 2, the home antenna 111 and the roaming antenna 113 can be separated by a predetermined distance relative to the system switch 115. The home antenna 111 and the roaming antenna 113 can have a different electrical length. Thus, the home antenna 111 and the roaming antenna 113 can resonate in a frequency band depending on the respective electrical length. Here, as the electrical length becomes short, the home antenna 111 or the roaming antenna 113 can resonate at higher frequency band. Alternatively, as the electrical length becomes longer, the home antenna 111 or the roaming antenna 113 can resonate at lower frequency band. For example, the home antenna 111 can be implemented with an electrical length which is shorter than that of the roaming antenna 113, so that the home antenna 111 may operate in USPCS (US Personal Communication Services) communication band, and the roaming antenna 113 operates in CDMA (Code Division Multiple Access communications) band that is lower than USPCS communications band. Note that at least one of the home antenna 111 or the roaming antenna 113 can be arranged in dead space e.g., ear jack. Moreover, as shown in FIG. 2, the terminal is embodied with a generally rectangular shape, and the antennas 111, 113 are each embodied in an L-shape with first and second portions. The first portions extend in a width direction of the rectangular shape on opposite ends of the terminal and are substantially parallel to one another. As shown, the first portion of each antenna 111, 113 is separated by a respective predetermined distance from the system switch 115, where the system switch 115 is disposed on a side portion of the terminal closer to the first portion of antenna 111. Further, the second portions of the home and roaming antennas extend from the system switch substantially collinearly along the side portion of the terminal.

The wireless communications unit 120 performs signal processing function and includes a RF transmitter which up-converts and amplifies frequency of signal transmitted through the antenna device 110, and a RF receiver which low-noise amplifies signal received through the antenna device 110 and down-converts frequency.

The memory 130 can be configured of a program memory and a data memory. The program memory stores programs for controlling the general operation of the communication terminal 100. The program memory can store programs for accessing communication system according to the embodiment of the present invention. The data memory performs the function of storing data which are generated while performing programs.

In the embodiment of the present invention, the memory 130 stores a preferred roaming list (PRL) configured of communication systems accessible by the communication terminal 100. The memory 130 can classify the communication systems into the home system and the roaming system in the preferred roaming list and store them according to priority. Note that the home system or the roaming system is previously set in the preferred roaming list and is also changeable during operation according to current location of the terminal.

The controller 140 performs the function of controlling the overall operation of communication terminal 100. The controller 140 includes a data processing unit equipped with a transmitter which encodes and modulates transmitted signal and a receiver which modulates and decodes received signal. The data processing unit can be comprised of a modem and a codec. Here, the codec includes a data codec which processes a packet data and an audio codec which processes an audio signal such as voice.

In the embodiment of the present invention, the controller 140 determines home system from the preferred roaming list when power is turned on, and controls the system switch 115 to connect to the home antenna 111. That is, the controller 140 can determine the home system corresponding to the current location of the terminal. Note that the home system is previously set in a preferred roaming list and is changeable according to current location of the terminal. Moreover, if the home system is accessed through the home antenna 111, the controller 140 uses home service.

Similarly, the controller 140 can determine the roaming system from the preferred roaming list. The roaming system is previously set in the preferred roaming list and is changeable according to current location of the terminal. That is, the controller can determine the roaming system corresponding to the current location of the terminal.

If home system is not accessed through the home antenna 111, the controller 140 controls the system switch 115 to connect to the roaming antenna 113. That is, when the controller 140 is not accessed to the home system, the controller cannot obtain the home service. Thus, switching to the roaming antenna may be set as default. If the roaming system is accessed through the roaming antenna 113, the controller 140 uses roaming service.

The audio processing unit 150 plays a reception audio signal outputted from the audio codec of data processing unit through speaker (SPK) or transmits a transmission audio signal generated from microphone (MIC) to the audio codec of the data processing unit. The display unit 160 displays user data outputted from the controller 140. Such display unit 160 can use LCD, and, in this case, includes a LCD controller, a memory which can store video data, and a LCD display device. In case the LCD is implemented of touch screen type, it can operate as an input unit. The key input unit 170 is made of keys for inputting numeric and character information and function keys for setting various functions.

Figure 3:
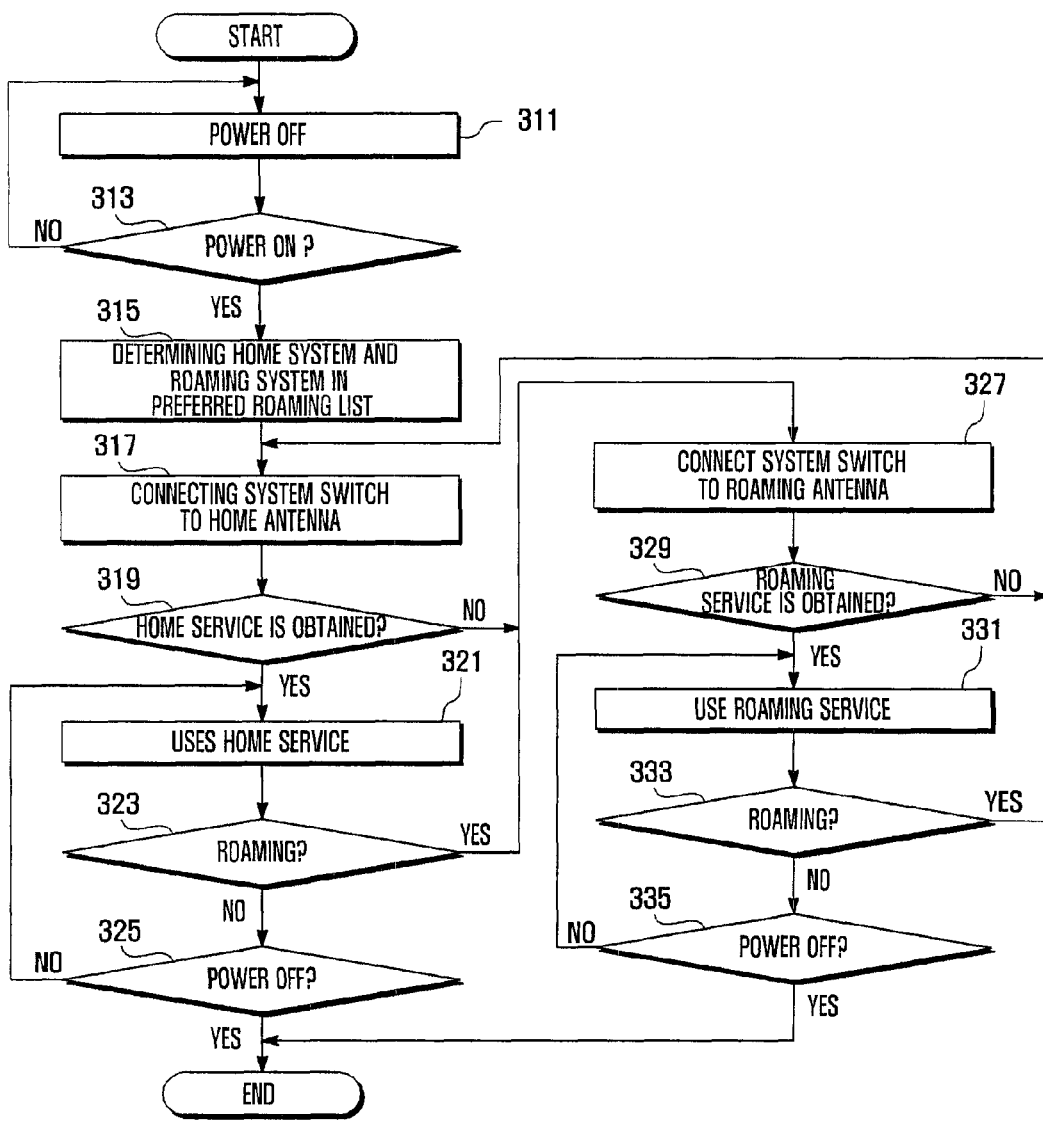
FIG. 3 is a flowchart illustrating a communications system access procedure according to an exemplary embodiment of the present invention.

FIG. 3 is a flowchart illustrating a communication system access procedure according to an exemplary embodiment of the present invention.

Referring to FIG. 3, the access procedure of the embodiment starts from the state where the power of communication terminal 100 is turned off (311). Then, in case power is turned on, the controller 140 senses (313) and determines the home system and the roaming system in the preferred roaming list (315). That is, the controller 140 determines one of a plurality of communication systems in the preferred roaming list as home system for preferentially connecting, while determines one of a plurality of communications systems as roaming system for connecting of second priority. Then, the controller 140 connects the system switch 115 to the home antenna 111 (317), while blocking power feeding from the controller 140 to the roaming antenna 113. If the home system is accessed through the home antenna 111 and the home service is obtained, the controller 140 senses this (319), and uses the home service (321). That is, the home antenna 111 operates at a certain frequency band, so that the controller 140 can receive signal of the home system, and can transmit signal to the home system. Then, in case of roaming occurs when using the home service at step 321, the controller 140 senses this (323), and connects the system switch 115 to the roaming antenna 111 (327). At this time, feeding from the controller 140 to the home antenna 111 is blocked, and power feeding from the controller 140 to the roaming antenna 113 is performed. Moreover, if the roaming system is accessed through the roaming antenna 113 and the roaming service is obtained, the controller 140 senses this (329), and makes use of the roaming service (331). That is, as the roaming antenna 111 operates at another frequency band, the controller 140 can receive signal of roaming system, and can transmit signal to the roaming system. And then, in case of roaming occurs when using the roaming service (331), the controller 140 senses this (333), and repeatedly performs at least part of step 317 to step 323 and step 327 to step 333.

Finally, in case power is turned off while roaming is not sensed at step 323 when using the home service at step 321, the controller 140 senses this (325) and terminates the communications system access procedure. At this time, if power off is not sensed at step 325, the controller 140 repeatedly performs at least part of step 317 to step 323 and step 327 to step 333.

In case power is turned off while roaming is not sensed at step 333 when using the roaming service at step 331, the controller 140 senses this (335), and terminates the communications system access procedure. At this time, if power off is not sensed at step 335, the controller 140 repeatedly performs at least part of step 317 to step 323 and step 327 to step 333.

Figure 4A:
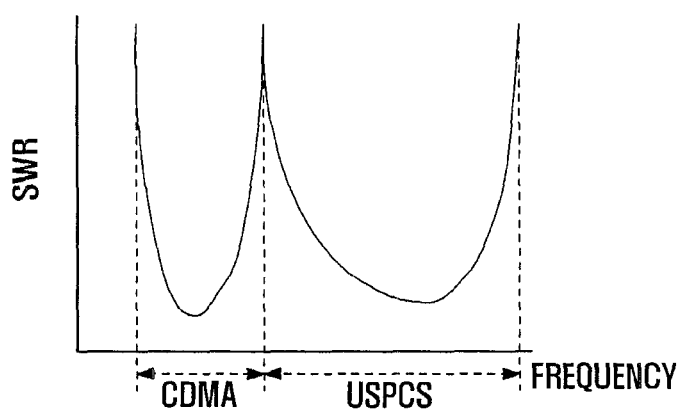
FIGS. 4a to 4c are a graph illustrating operating characteristics of a communication terminal according to an exemplary embodiment of the present invention.
Figure 4B:
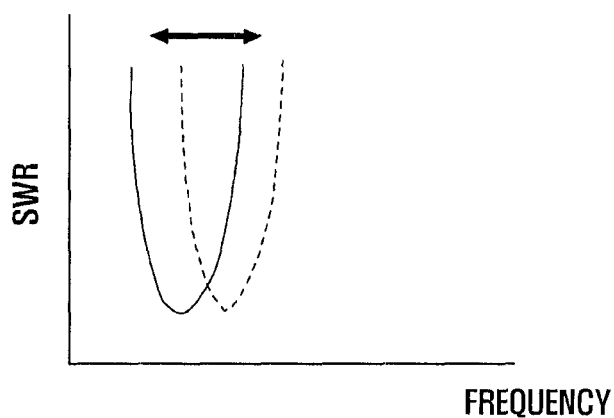
Figure 4C:
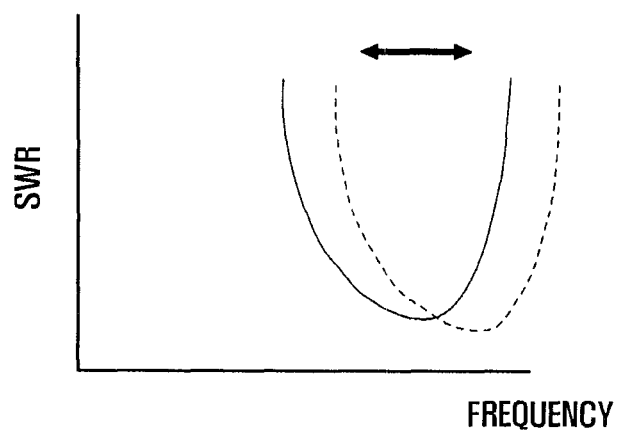

FIGS. 4*a* to 4*c* are a graph illustrating operating characteristics of a communication terminal according to an exemplary embodiment of the present invention. As shown in FIG. 4*a*, the communications terminal 100 of the embodiment can operate at least two frequency bands through the home antenna 111 and the roaming antenna 113. For example, the home antenna 111 can operates in USPCS communications band, and the roaming antenna 113 can operate in CDMA communications band. At this time, the communications terminal 100 of the embodiment can perform tuning for the home antenna 111 or the roaming antenna 113 through the system switch 115. As shown in FIG. 4*b*, by changing the shape or size of the home antenna 111, the frequency band for operating in the home antenna 111 can be changed. For example, when the communication terminal 100 uses the home service through the home antenna 111, the frequency band which practically operates in the home antenna 111 can be measured. This is a process for tuning shape and size of antenna. That is, the frequency band of the antenna is measured during the manufacture of terminal with the antenna. And the measured frequency band is not the desired frequency band, the shape and size of the antenna can be adjusted. Accordingly, the antenna can be manufactured to operate with the desired frequency band. Thus, by changing the shape or the size of the home antenna 111, the frequency band of the home antenna 111 can be minutely adjusted. Similarly, by changing the shape or the size of the roaming antenna 113, as shown in FIG. 4*c*, the frequency band for operating in the roaming antenna 113 can be changed. For example, when the communication terminal 100 uses the roaming service through the roaming antenna 113, the frequency band which practically operates in the roaming antenna 113 can be measured. Thus, by changing the shape or the size of the roaming antenna 113, the frequency band of the roaming antenna 113 can be minutely adjusted.

According to the teachings of the present invention, a plurality of antennas can be mutually isolated through system switch for operation. That is, when one of the antennas operates in communication terminal, the operation of rest antennas is restrained. The ordering determination of switching among the antennas is defined according to a predetermined format, then switching the connection is performed accordingly. Hence, the interference between antennas can be prohibited in the communication terminal.

The method of the present invention as described above is implemented as a program which can be stored in a recording medium, for example, a CD-ROM disc, RAM, a floppy disc, a hard disc, and a magneto-optical disc, etc, which are read by a computer and executed thereby.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of accessing a plurality of communication systems in a terminal having a plurality of antennas and a wireless communication unit, the method comprising:
determining a home system from a preferred roaming list having the plurality of communications systems associated with different ones of the plurality of antennas, respectively;
connecting, by a system switch, the wireless communication unit with a home antenna and disconnecting all other antennas of the plurality of antennas, for communicating at a predetermined frequency band via the home system;
providing the home service through the home antenna; and
determining if the home system is not available, and if so, connecting the system switch to a roaming antenna of the plurality of antennas and providing a roaming service through the roaming antenna;
wherein the home antenna and roaming antenna have first portions thereof each separated by a respective predetermined distance from the system switch and oriented substantially parallel on opposite ends of the terminal, the home antenna and roaming antenna resonating in different frequency bands; and
wherein the system switch is disposed closer to one of the roaming antenna and home antenna on a side portion of the terminal.

2. The method of claim 1, wherein the plurality of antennas are comprised of the home antenna and the roaming antenna, and the system switch is a single pole, multiple throw switch.

3. The method of claim 1, wherein the terminal has a generally rectangular shape, and the plurality of antennas extend in a width direction of the rectangular shape on opposing sides of the terminal.

4. The method of claim 1, further comprising changing the home system to the roaming system based on a location of the terminal.

5. The method of claim 1, further comprising changing the roaming system to the home system based on a location of the terminal.

6. The method of claim 1, wherein the preferred roaming list comprises the home system as a first priority and the roaming system as a second priority.

7. The method of claim 6, wherein the home system is determined from the preferred roaming list based on a priority.

8. A communication terminal using multi frequency band, the communication terminal comprising:
a memory which stores a preferred roaming list having a plurality of communications systems;
a wireless communications unit including an RF transmitter and an RF receiver, and which performs signal processing;
a home antenna configured to access a home system based on a priority set in the preferred roaming list and provides a home service through a first predetermined frequency band;
a roaming antenna configured to access a roaming system for providing a roaming service through a second predetermined frequency band;
a system switch selectively coupling the wireless communication unit with one of the home antenna and the roaming antenna; and
a controller which controls the system switch to connect the wireless communication unit with one of the home antenna and the roaming antenna, thereby disconnecting the other one of the home antenna and the roaming antenna from the wireless communication unit;
wherein the home antenna and roaming antenna have first portions thereof each separated by a respective predetermined distance from the system switch and oriented substantially parallel to one another on opposite ends of the communication terminal, the home antenna and roaming antenna resonating in different frequency bands; and
the system switch is disposed closer to one of the roaming antenna and home antenna on a side portion of the terminal.

9. The communication terminal of claim 8, wherein the system switch is a single pole, multiple throw switch.

10. The communication terminal of claim 8, wherein the communication terminal has a generally rectangular shape, and the home antenna and roaming antenna each extend in a width direction of the rectangular shape on opposing sides of the terminal.

11. The communication terminal of claim 8, wherein the home system is changed to the roaming system based on a location of the terminal.

12. The communication terminal of claim 8, wherein the roaming system is changed to the home system based on a location of the terminal.

13. A method of selecting one of plurality of antennas in a mobile terminal for communication, wherein the mobile terminal having a wireless communication unit and the method comprising:
determining whether to select a home antenna or a roaming antenna of the plurality of antennas based on a priority from a predetermined preferred list;
selectively connecting, based on the priority, the wireless communication unit with one of the home antenna and the roaming antenna and disconnecting the other one of the home antenna and the roaming antenna; and
providing one of a home service through the home antenna and a roaming service through the roam antenna based on the selective coupling;
wherein the home antenna and roaming antenna have first portions thereof each separated by a respective predetermined distance from the system switch and oriented substantially parallel to one another on opposite ends of the terminal, the home antenna and roaming antenna resonating in different frequency bands; and
wherein the system switch is disposed closer to one of the roaming antenna and home antenna on a side portion of the terminal.

14. The method of claim 13, wherein the system switch is a single pole, multiple throw switch.

15. The method of claim 13, wherein the mobile terminal has a generally rectangular shape, and the plurality of antennas extend in a width direction of the rectangular shape on opposing sides of the terminal.

16. The method of claim 13, wherein the coupling to the home antenna is changed to the roaming antenna based on a location of the terminal.

17. The method of claim 13, wherein the coupling to the roaming antenna is changed to the home antenna based on a location of the terminal.

* * * * *